United States Patent [19]
Egan et al.

[11] Patent Number: 5,875,308
[45] Date of Patent: Feb. 23, 1999

[54] PERIPHERAL COMPONENT INTERCONNECT (PCI) ARCHITECTURE HAVING HOT-PLUGGING CAPABILITY FOR A DATA-PROCESSING SYSTEM

[75] Inventors: Patrick Kevin Egan; Daniel Frank Moertl; Thomas James Osten; Daniel James Sucher, all of Rochester, Minn.

[73] Assignee: International Business Machines Corporation, Armonk, N.Y.

[21] Appl. No.: 878,025

[22] Filed: Jun. 18, 1997

[51] Int. Cl.[6] .............................. G06F 13/00; G06F 13/40
[52] U.S. Cl. ............................... 395/283; 395/309
[58] Field of Search ..................... 395/281–283, 395/308, 309, 800.33; 361/683, 686

[56] References Cited

U.S. PATENT DOCUMENTS

| | | | |
|---|---|---|---|
| 4,999,787 | 3/1991 | McNally et al. | 395/283 |
| 5,572,395 | 11/1996 | Rasums et al. | 361/58 |
| 5,664,119 | 9/1997 | Jeffries et al. | 395/283 |
| 5,673,399 | 9/1997 | Guthrie et al. | 395/308 |
| 5,712,754 | 1/1998 | Sides et al. | 361/58 |
| 5,761,462 | 6/1998 | Neal et al. | 395/309 |
| 5,768,612 | 6/1998 | Nelson | 395/800.12 |
| 5,771,387 | 6/1998 | Young et al. | 395/733 |

OTHER PUBLICATIONS

PCI Hot–Plug Specification Draft Revision 0.9, Mar. 5, 1997.

*Primary Examiner*—Gopal C. Ray
*Attorney, Agent, or Firm*—Andrew J. Dillon; Matthew J. Bussan

[57] ABSTRACT

An enhanced peripheral component interconnect (PCI) architecture for a data-processing system is described. In accordance with the method and system of the present invention, a peripheral component interconnect (PCI) architecture for a data-processing system comprises a PCI host bus, a number of PCI local buses, and a PCI hot-plug bridge. Each of the local PCI buses has an adapter card slot. The PCI hot-plug bridge, connected between the PCI host bus and the PCI local buses, is utilized for controlling power to each of the PCI local buses, such that a PCI adapter card may be removed from or added to any one of the adapter card slots during power up while there is processing ongoing within adapter card(s) situated in other adapter card slot(s).

11 Claims, 2 Drawing Sheets

PERIPHERAL COMPONENT INTERCONNECT (PCI) ARCHITECTURE HAVING HOT-PLUGGING CAPABILITY FOR A DATA-PROCESSING SYSTEM

BACKGROUND OF THE INVENTION

1. Technical Field

The present invention relates to an architecture for data processing in general, and in particular to a peripheral component interconnect architecture within a data-processing system. Still more particularly, the present invention relates to an enhanced peripheral component interconnect architecture having hot-plugging capability for a data-processing system.

2. Description of the Prior Art

A computer system or data-processing system typically includes a system bus. Attached to the system bus are various devices that may communicate locally with each other over the system bus. For example, a typical computer system includes a system bus to which a central processing unit (CPU) is attached and over which the CPU communicates directly with a system memory that is also attached to the system bus.

In addition, the computer system may include a local bus for connecting certain highly integrated peripheral components on the same bus as the CPU. One such local bus is known as the Peripheral Component Interconnect (PCI) bus. Under the PCI local bus standard, peripheral components can directly connect to a PCI local bus without the need for "glue" logic. Thus, PCI provides a bus standard on which high-performance peripheral devices, such as graphics displaying devices and motion video displaying devices, can be coupled to the CPU, thereby permitting these high-performance peripheral devices to avoid the general access latency and the bandwidth constraints that would have occurred if these peripheral devices were connected to a standard peripheral bus.

PCI local bus is a high performance, 32-bit or 64-bit bus with multiplexed address and data lines. Any PCI component and add-in card interface is processor independent, enabling an efficient transition to future processor generations and usage with multiple processor architectures. Processor independence also allows the PCI local bus to be optimized for I/O functions, enables concurrent operation of the local bus with the processor/memory subsystem, and accommodates multiple high performance peripheral devices. In addition, a transparent 64-bit extension of the 32-bit data and address buses under the PCI local bus allows the bus bandwidth to be doubled and offers forward and backward compatibility of 32-bit and 64-bit PCI local bus peripherals.

Most computer buses are generally not designed to handle any unexpected removal of peripheral devices from the bus itself. Suffice to say, inserting or removing an adapter card from an adapter slot that is attached to a computer bus without following the proper sequence may lead to unpredictable results, including data corruption, abnormal termination of operating system, or damage to adapter card or platform hardware.

There is a provision for hot-plugging capability under the PCI local bus, and the hot-plugging standard for PCI local bus is defined under the PCI Hot-Plug Specification, Revision 0.9, promulgated by the PCI Special Interest Group, which is hereby incorporated by reference. While the PCI hot-plug standard is generally defined in the above-mentioned publication, the detailed implementation is not specified. The present disclosure describes the electronics and service indicators of an enhanced PCI architecture that are necessary to enable such hot-plugging capability.

SUMMARY OF THE INVENTION

In view of the foregoing, it is therefore an object of the present invention to provide an improved architecture for data processing.

It is another object of the present invention to provide an improved peripheral componentinterconnect architecture within a data-processing system.

It is yet another object of the present invention to provide an enhanced peripheral component interconnect architecture having hot-plugging capability for a data-processing system.

In accordance with the method and system of the present invention, a peripheral component interconnect (PCI) architecture for a data-processing system comprises a PCI host bus, a number of PCI local buses, and a PCI hot-plug bridge. Each of the local PCI buses has an adapter card slot. The PCI hot-plug bridge, connected between the PCI host bus and the PCI local buses, is utilized for controlling power to each of the PCI local buses, such that a PCI adapter card may be removed from or added to any one of the adapter card slots during power up while there is processing ongoing within adapter card(s) situated in other adapter card slot(s).

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

The present invention may be applicable in a variety of computers under a number of different operating systems. The computer may be, for example, a personal computer, a mid-range computer, or a mainframe computer. For the purpose of illustration, a preferred embodiment of the present invention, as described below, is implemented on a mid-range computer, such as the IBM AS/400™, manufactured by International Business Machines Corporation. IBM AS/400™ is a trademark of International Business Machines Corporation.

Figure 1:
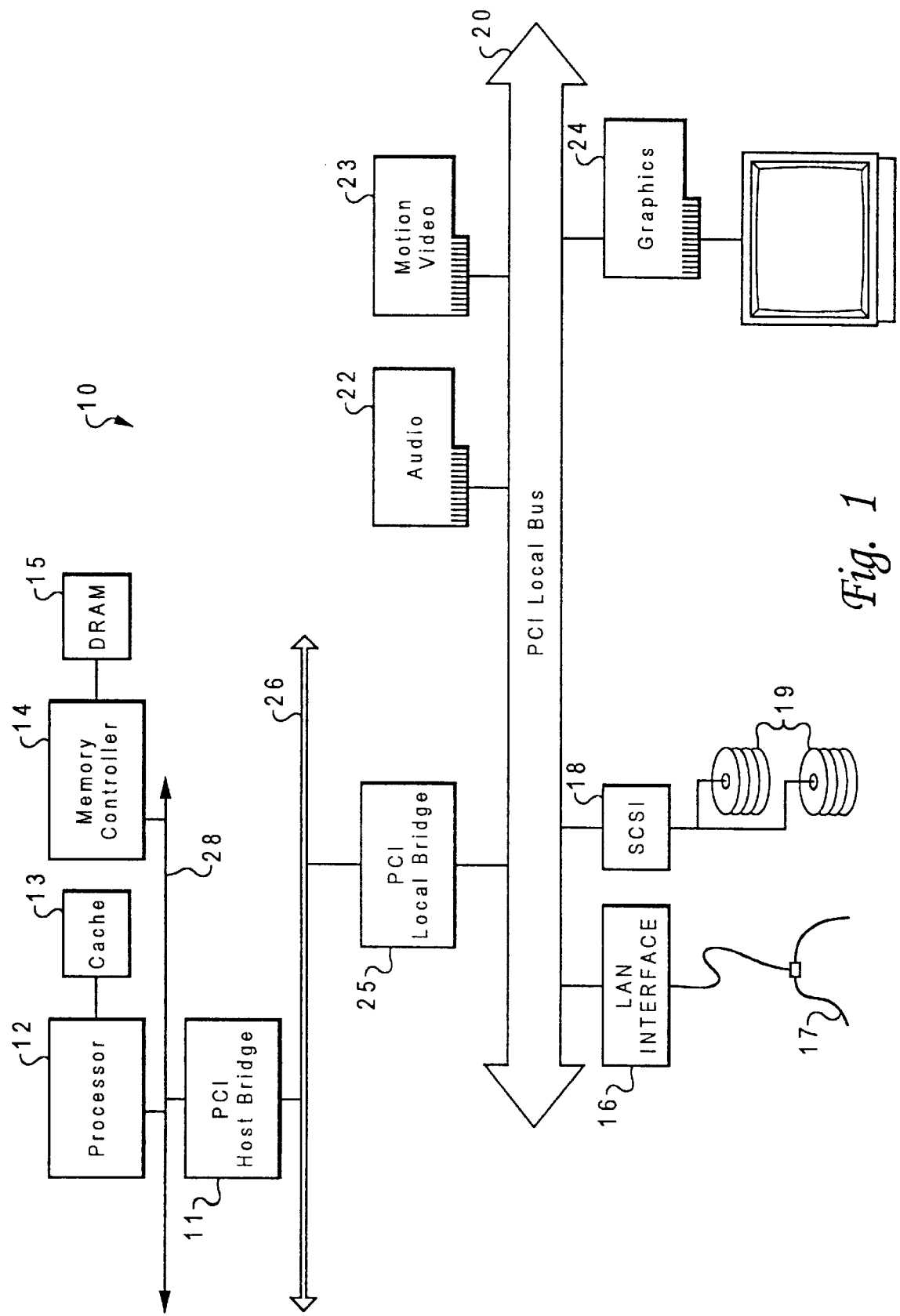
FIG. 1 is a block diagram of a typical computer system having a PCI local bus architecture in which a preferred embodiment of the present invention may be applicable.

Referring now to the drawings and in particular to FIG. 1, there is depicted a block diagram of a typical computer system having a PCI local bus architecture in which a preferred embodiment of the present invention may be applicable. As shown, a processor 12, a cache memory 13, a memory controller 14, and a Dynamic Random Access Memory (DRAM) 15 are connected to a system bus 28 of a computer system 10. Processor 12, cache memory 13, memory controller 14, and DRAM 15 are also coupled to a PCI host bus 26 of computer system 10 through a PCI host bridge 11. Further, PCI host bus 26 is coupled to a PCI local bus 20 via a PCI local bridge 25. PCI host bridge 11 and PCI local bridge 25 provide a low latency path through which processor 12 may directly access PCI devices mapped anywhere within bus memory and/or I/O address spaces. PCI host bridge 11 and PCI local bridge 25 also provide a high bandwidth path allowing PCI masters direct access to DRAM 15. PCI host bridge 11 and PCI local bridge 25 may include various functions such as data buffering/posting and arbitration.

Also attaching to PCI local bus 20 may be other devices such as a local-area network (LAN) interface 16 and a small computer system interface (SCSI) 18. LAN interface 16 is for connecting computer system 10 to a local-area network 17 such as Ethernet or token-ring. SCSI 18 is utilized to control high-speed SCSI disk drives 19.

In general, PCI local bus 20 may support up to four add-in board connectors without requiring any expansion capability. Audio adaptor board 22, motion video adaptor board 23, and graphics adaptor board 24 are examples of some devices that may be attached to PCI local bus 20 via add-in board connectors.

Figure 2:
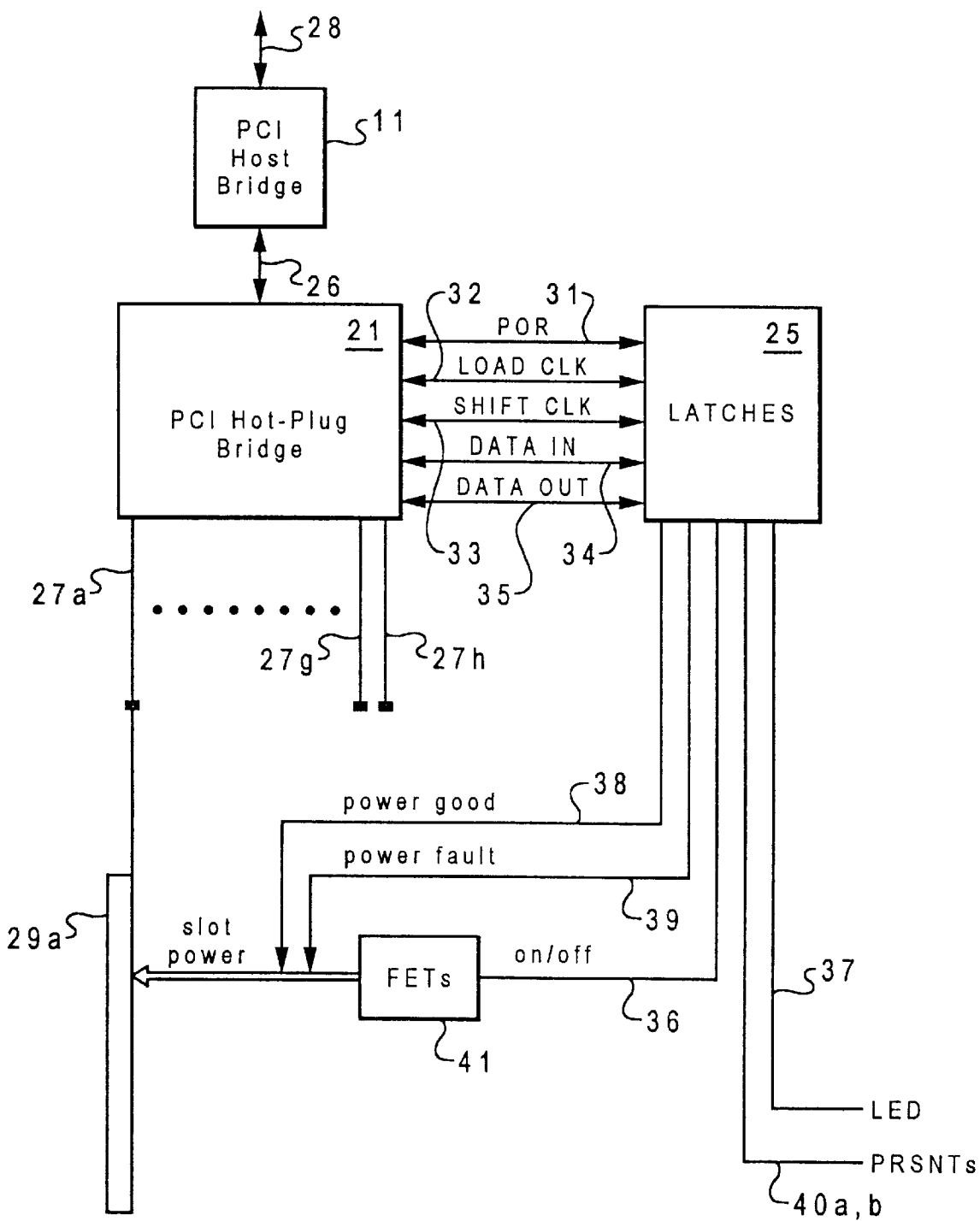
FIG. 2 is a block diagram of a PCI local bus architecture having hot-plugging capability for a data-processing system, in accordance with a preferred embodiment of the present invention.

With reference now to FIG. 2, there is illustrated a block diagram of an enhanced PCI local bus architecture having hot-plugging capability for a data-processing system, in accordance with a preferred embodiment of the present invention. As shown, PCI host bus 26 is coupled to system bus 28 via PCI host bridge 11, and PCI host bus 26 is connected to a PCI hot-plug bridge 21. A PCI bus on the primary side of PCI hot-plug bridge 21, such as PCI host bus 26, is called a PCI host bus or primary PCI bus. PCI host bridge 11 is responsible for generating PCI host buses. All PCI buses coming out from the secondary side of PCI hot-plug bridge 21, such as PCI local buses 27a–27h, are called PCI local buses or secondary PCI buses.

In accordance with a preferred embodiment of the present invention, for each primary PCI bus within the data-processing system, PCI hot-plug bridge 21 may provide up to eight separate secondary PCI local buses 27a–27h. However, It is understood by those skilled in the art that any number of secondary PCI buses may also be possible. Each secondary PCI local bus is further connected to an adapter slot. For example, as shown in FIG. 2, secondary PCI local bus is connected to an adapter slot 29a.

Furthermore, PCI hot-plug bridge 21 is also coupled to latches 25. As a preferred embodiment of the invention, PCI hot-plug bridge 21 is coupled to latches 25 via five different I/O pins, namely, Power-on Reset 31, Load Clock 32, Shift Clock 33, Data In 34, and Data Out 35. Each of respective pins 31-35 is for latch-up, reading, or driving Service Indicators and Power Control Circuits on a per-adapter slot basis. On the other hand, the outputs of latches 25 are:

8 outputs for FET control, one per adapter slot 8 outputs for LEDs, one per adapter slot 8 inputs for detecting power good, one per adapter slot 8 inputs for detecting power fault, one per adapter slot 16 outputs for detecting adapter card present, two per adapter slot For the purpose of illustration, only one set of outputs from latches 25 is shown to be coupled to adapter slot 29a. Another sets of outputs (not shown) from latches 25 are coupled to each of the other adapter slots (not shown) corresponding to secondary PCI buses 27b–27h. FET control 36 is utilized to instruct FETs 41 to turn power on or off for adapter slot 29a. FET control 36 is indirectly controlled by a latch within a register of PCI hot-plug bridge 21. During power-on reset, FET control 36 will be driven low. After power-on reset, PCI hot-plug bridge 21 will power up all the adapter slots. The powering up may be done all at once or in sequence. After the powering up, an adapter slot may be turned on or off by firmware. A FET control logic (not shown) will also ensure FETs 41 are off during the time power-on reset is active or until power to PCI hot-plug bridge 21 is good.

An LED 37 is utilized to indicate when concurrent repair can be done. LED 37 is indirectly controlled by a latch within a register of PCI hot-plug bridge 21. As a preferred embodiment of the present invention, valid states for LED 37 are on, off, and blinking. During power-on reset, LED 37 will be turned off. After power-on reset, LED 36 may be turned on, off, or set to blinking.

Power good input 38 is utilized to inform PCI hot-plug bridge 21 that the voltage to an individual adapter slot, such as adapter slot 29a, is proper. This is needed because FETs 41 will turn on power slowly to an adapter card to aid in charging of certain internal capacitors. If the adapter card is shorted somehow, then the power will not come up. In order to prevent damage to the drivers in PCI hot-plug bridge 21, PCI hot-plug bridge 21 will keep the PCI local bus associated with that adapter card in a tri-state. PCI hot-plug bridge 21 then monitors power good input 38, and will notify the operating system (or any other pertinent control software) when the PCI local bus changes its state. When power good input 38 is detected to be going INACTIVE on any clock cycle, PCI hot-plug bridge 21 will put its drivers for the PCI local buses in a tri-state mode, and write the value in a register and generates an interrupt. When power good input 38 is detected going ACTIVE for at least 20 ms, PCI hot-plug bridge 21 will enable its drivers for the PCI local buses, and write the value in a register and generates an interrupt.

Power fault input 39 informs PCI hot-plug bridge 21 that the backplane FET has read an overcurrent fault, and that is why power good input 38 is not asserted. In this situation, it would most likely be related to a defective adapter card. If power good input 38 is not asserted and no overcurrent is driven, then it would most likely be attributed to a defective PCI hot-plug bridge 21 or faulty FETs 41. PCI hot-plug bridge 21 monitors power fault input 39 to notify any related software when power fault input 39 changes its state. When power fault input 39 is detected to be going ACTIVE on any clock cycle, PCI hot-plug bridge 21 then writes the value in a register and generates an interrupt. When power fault input 39 is detected to be going INACTIVE for at least 20 ms, PCI hot-plug bridge 21 then writes the value in a register and generates an interrupt.

In addition, PCI hot-plug bridge 21 is able to sense two card power detect pins (i.e., PRSNT 40a and PRSNT 40b) for each of the adapter slots. All these 48 output signals from latches 25 are controlled with only four of the five I/O pins from PCI hot-plug bridge 21, namely, Load Clock 32, Shift Clock 33, Data In 34, and Data Out 35.

Because all the output signals from latches 25 also indicate adapter card power usage (wattage), the output signals will also be fed into a local power regulator (not shown) that will surface a fault to a System Power Control Network (SPCN) if the maximum power of the local power regulator is exceeded. In turn, SPCN will surface a fault to an operating system of the data-processing system, indicating the adapter card configuration under PCI hot-plug bridge 21 is invalid. Thus, the local power regulator prevents power from being applied if the adapter card power is exceeded.

While a standard PCI bridge (such as PCI local bridge 25 in FIG. 1) may allow multiple adapter cards to be connected to a single PCI local bus, PCI hot-plug bridge 21 generates up to eight secondary PCI bridge and utilizes one secondary PCI bus for each adapter card. Therefore, PCI hot-plug bridge 21 can centralize power control and other various service functions to multiple secondary PCI buses as well as eliminate the loading effects introduced by multiple adapter cards per secondary PCI bus. Each of PCI local buses 27a–27h are also provided with controlled tri-stable outputs, thus, power can be removed without damage to PCI hot-plug bridge 21, PCI host bridge 11, or any other non-affected secondary PCI buses.

The following is an example for a concurrent repair operation utilizing the PCI hot-plugging architecture and design, in accordance with a preferred embodiment of the present invention. First, the host interface requests power to be turned off at a desired adapter slot. Then, the host software quiesces a corresponding secondary PCI bus slot for the desired adapter slot and the tri-state output of PCI hot-plug bridge 21. PCI hot-plug bridge 21 then drops power to the FETs (+3.3V, +5.0V, +12.0V, −12.0V) of the desired adapter slot. Subsequently, PCI hot-plug bridge 21 lights an LED associated with the desired adapter slot to indicate concurrent repair can now be performed. At this point, a customer engineer (or any qualified technician) can remove the adapter card from the adapter slot. There is no time constraint because the power is only turned off to the one affected secondary PCI bus. PRSNT lines 40a, 40b then indicate the adapter card has been removed from the desired adapter slot. After a new adapter card has been installed, PRSNT lines 40a, 40b will indicate the completion of the installation. PCI hot-plug bridge 21 then drives power on to the adapter slot after PCI hot-plug bridge 21 receives power from a backplane slot. Finally, PCI hot-plug bridge 21 resumes bus operations as normal.

As has been described, the present invention provides an enhanced PCI architecture having hot-plugging capability for a data-processing system. This enhanced PCI architecture permits PCI adapter cards to be hot-pluggable, i.e, any individual adapter card may be removed or added during power up while useful processing is occurring at other parts of the data-processing system. The PCI hot-plug bridge, under the present invention, has one primary PCI bus (PCI host bus) as the input and preferably eight secondary PCI buses (PCI local bus) as the outputs. The PCI hot-plug bridge provides electrical PCI local isolation among all adapter slots such that hot-plug can be performed without glitching or affecting the operation of other secondary PCI buses that are running under the primary PCI bus. In addition, the PCI hot-plug bridge also provides logical bus isolation such that a PCI adapter card may be hot-plugged into each or any adapter slot while the other installed PCI adapter cards may continue running their normal operations.

While the invention has been particularly shown and described with reference to a preferred embodiment, it will be understood by those skilled in the art that various changes in form and detail may be made therein without departing from the spirit and scope of the invention.

What is claimed is:

1. A peripheral component interconnect (PCI) architecture for a data-processing system, comprising:

a PCI host bus;

a plurality of PCI local buses, wherein each of said PCI local buses has an adapter card slot; and a PCI hot-plug bridge, connected between said PCI host bus and said plurality of PCI local buses, for controlling power to said plurality of PCI local buses, wherein a PCI adapter card is capable of being removed from or added to an adapter card slot during processing ongoing within at least one other adapter card situated in an adapter card slot, wherein said PCI hot-plug bridge further includes at least four control signals for controlling a latch.

2. The PCI architecture for a data-processing system according to claim 1, wherein said plurality of PCI local buses range from two PCI local buses to eight PCI local buses.

3. The PCI architecture for a data-processing system according to claim 1, wherein said latch further include at least five outputs, wherein three of said five outputs are utilized to control an adapter card slot associated with one of said plurality of PCI local buses.

4. The PCI architecture for a data-processing system according to claim 3, wherein said five outputs include a FET control signal, a power good signal, and a power fault signal.

5. A computer system having a peripheral component interconnect (PCI) architecture, comprising:

a processor;

a system memory associated with said processor, connected to a system bus;

a PCI host bridge coupled said system bus to a PCI host bus;

a PCI hot-plug bridge coupled to said PCI host bus for providing a plurality of PCI local buses, wherein each of said plurality of PCI local buses is associated with a PCI adapter card slot, wherein said PCI hot-plug bridge further controls power to each of said plurality of PCI local buses, whereby a PCI adapter card is capable of being removed from or added to an adapter card slot during processing ongoing within at least one other adapter card situated in an adapter card slot.

6. The computer system having a PCI architecture according to claim 5, wherein said plurality of PCI local buses range from two PCI local buses to eight PCI local buses.

7. The computer system having a PCI architecture according to claim 5, wherein said PCI hot-plug bridge further includes at least four control signals for controlling a latch.

8. The computer system having a PCI architecture according to claim 7, wherein said latch further include at least five outputs, wherein three of said five outputs are utilized to control an adapter card slot on one of said plurality of PCI local buses.

9. The computer system having a PCI architecture according to claim 8, wherein said five outputs include a FET control signal, a power good signal, and a power fault signal.

10. A method for providing an enhanced peripheral component interconnect (PCI) architecture for a data-processing system, wherein said data-processing system includes a system bus and a PCI host bus, said method comprising the steps of:

connecting a PCI host bridge between said system bus and said PCI host bus; and connecting a PCI hot-plug bridge to said PCI host bus for providing a plurality of PCI local buses, wherein each of said plurality of PCI local buses is associated with a PCI adapter card slot, wherein said PCI hot-plug bridge further controls power to each of said plurality of PCI local buses, whereby a PCI adapter card is capable of being removed from or added to an adapter card slot during processing ongoing within at least one other adapter card situated in an adapter card slot.

11. The method for providing an enhanced PCI architecture for a data-processing system according to claim 10, wherein said plurality of PCI local buses range from two PCI local buses to eight PCI local buses.

* * * * *